(12) United States Patent
Akyildiz et al.

(10) Patent No.: US 11,784,711 B2
(45) Date of Patent: *Oct. 10, 2023

(54) NETWORK EMPLOYING CUBE SATELLITES

(71) Applicant: Georgia Tech Research Corporation, Atlanta, GA (US)

(72) Inventors: Ian F. Akyildiz, Alpharetta, GA (US); Ahan Kak, Atlanta, GA (US); Shuai Nie, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,328

(22) Filed: Aug. 31, 2022

(65) Prior Publication Data

US 2023/0006736 A1 Jan. 5, 2023

Related U.S. Application Data

(63) Continuation of application No. 17/051,290, filed as application No. PCT/US2019/066523 on Dec. 16, 2019, now Pat. No. 11,476,926.

(60) Provisional application No. 62/780,136, filed on Dec. 14, 2018, provisional application No. 62/780,085, filed on Dec. 14, 2018.

(51) Int. Cl.
*H04B 7/195* (2006.01)
*H04B 7/0452* (2017.01)
*H04B 7/185* (2006.01)

(52) U.S. Cl.
CPC .......... *H04B 7/195* (2013.01); *H04B 7/0452* (2013.01); *H04B 7/1855* (2013.01); *H04B 7/18513* (2013.01); *H04B 7/18519* (2013.01); *H04B 7/18543* (2013.01)

(58) Field of Classification Search
CPC .. H04B 7/195; H04B 7/0452; H04B 7/18513; H04B 7/18519; H04B 7/18543; H04B 7/155
See application file for complete search history.

(56) References Cited

U.S. PATENT DOCUMENTS

2017/0070939 A1 * 3/2017 Chong ............... H04B 7/18513
2019/0116544 A1 * 4/2019 Glottmann ............ H04W 40/30

FOREIGN PATENT DOCUMENTS

AU 2011355641 A1 * 7/2013 ............. H01Q 1/007

* cited by examiner

*Primary Examiner* — Keith Ferguson
(74) *Attorney, Agent, or Firm* — Bryan W. Bockhop; Bockhop Intellectual Property Law, LLC

(57) ABSTRACT

A space-based communications network (100) includes at least one central ground station (116) having a transceiver that is configured to communicate with satellites, such as cube satellites (110). The cube satellites (110) form an ad hoc network of orbital cube satellites, in which each of the cube satellites (110) communicate with each other. One of the cube satellites communicates with the ground station (116). A ground-based control system (1000) communicates with the central ground station (116). The control system (1000) continuously determines a configuration of the ad hoc network (100) and communicates network control information for the cube satellites (110) to maintain communications in the ad hoc network (100). The cube satellites (110) disseminate the network control to each other via the ad hoc network (100).

14 Claims, 10 Drawing Sheets

NETWORK EMPLOYING CUBE SATELLITES

CROSS-REFERENCE TO RELATED APPLICATION(S)

This application is a continuation of U.S. patent application Ser. No. 17/051,290, filed Oct. 28, 2020, which is a US National Phase Entry of PCT/US19/66523, filed Dec. 16, 2019, which claims the benefit of U.S. Provisional patent application Ser. No. 62/780,085, filed Dec. 14, 2018, and U.S. Provisional patent application Ser. No. 62/780,136, filed Dec. 14, 2018, the entirety of each of which is hereby incorporated herein by reference.

BACKGROUND OF THE INVENTION

1. Field of the Invention

The present invention relates to communications networks and, more specifically, to a space-based communications network employing cube satellites.

2. Description of the Related Art

The Internet of Things (IoT) has been recognized as a driver of 5G wireless communications, with a projected 50 billion endpoints by 2020 ranging from connected temperature sensors to unmanned aerial vehicles. The long-term success of IoT will be tied to its pervasiveness. Realization of the full potential of IoT will be realized when it is augmented with a ubiquitous connectivity platform capable of functioning even in remote of locations, such as jungles, the poles, etc.

Over the past four years, the IoT market has witnessed rapid growth, expanding by over 30% per year as of 2017. Worldwide expenditure on IoT solutions is expected to exceed 7 trillion dollars by 2020. While certain smart devices, enhanced connectivity, and emerging standards play an important role in IoT adoption, global connectivity remains an important concern. For example, freight transportation companies could benefit from having access to their consignments irrespective of location. Such access would require connectivity across urban, rural areas and even oceans.

However, the most current IoT solutions today rely on integration of wireless personal area networks (WPANs, e.g., Bluetooth, Zigbee, Z-Wave, among others), Wireless Local Area Networks (WLANs, e.g., WiFi), Wide Area Networks (WAN, i.e., 3G, 4G, and 5G), and, recently, Low Power WANs (LPWANs, e.g., LoRa, Sigfox, and NB-IoT).

The drawback of such solutions is their reliance on pre-existing infrastructure, which limits their coverage to, for example, geographical areas lacking coverage (such as the North and South Poles), low-density population areas and high-cost of infrastructure areas such as remote forests and deserts).

To this end, satellites have been used as a means for providing global communications coverage. However, traditional satellite systems tend to have certain disadvantages, such as: long development cycles, high development costs, increasing congestion, lack of redundancy, and high-risk exposure.

A CubeSat (a U-class spacecraft) is a small satellite that includes one or more cubic satellite units having dimensions of 10 cm×10 cm×11.35 cm and a mass of no more than 1.33 kilograms per unit. They typically are made from commercial off-the-shelf parts. A typical CubeSat is typically launched as secondary payloads on a launch vehicle or is placed in orbit from a space station. CubeSats are designed for deployment in low earth orbits and, because of their small size and low orbits, tend to be relatively inexpensive.

Therefore, there is a need for a low-cost global satellite system for implementing the Internet of Things.

Therefore, there is also a need for a global satellite system that integrates with conventional communications infrastructure.

SUMMARY OF THE INVENTION

The disadvantages of the prior art are overcome by the present invention which, in one aspect, is a space-based communications network that includes at least one central ground station having a transceiver that is configured to communicate with satellites. A space-based ad hoc network of a plurality of cube satellites is in orbit. Each of the cube satellites is in a different orbit and is configured to communicate directly with any other of the plurality of cube satellites that is within a line of sight thereto. At least one of the plurality of cube satellites is configured to communicate with the at least one ground station. A ground-based control system is in communication with the at least one central ground station. The control system is configured continuously to determine a configuration of the ad hoc network and to communicate network control information for each of the cube satellites that is necessary to maintain communications in the ad hoc network to at least one of the plurality of cube satellites. The at least one of the plurality of cube satellites is configured to disseminate the network control to other ones of the plurality of cube satellites via the ad hoc network.

In another aspect, the invention is a satellite that includes a structure conforming to a cube satellite standard. An electrical power system is disposed within the structure and powers elements of the satellite. A command and data handling unit is configured to process data received by the satellite. An attitude determination and control unit determines an attitude of the satellite with respect to a reference and provides attitude data to the command and data handling unit. At least one payload performs a predetermined operation in response to a command from the command and data handling unit. A communications unit effects communications between the command and data handling unit and a remote entity, wherein the remote entity includes at least one other cube satellite.

In another aspect, the invention is a space-based communications network that includes an ad hoc data network of cube satellites in which each satellite has an orbit. At least one ground station is in data communication with at least one of the cube satellites during at least a portion of the at least one of the cube satellite's orbits. The ground system includes a control system processor. The control system processor is operable to generate communications link instructions to the at least one of the cube satellites. The communications link instructions include instructions for each of the cube satellites specifying connection information to at least one other satellite during a predetermined period so that each of the cube satellites remains connected to the ad hoc data network. A network base is in communication with the control system processor and stores status information. A virtualization manager is in communication with the control system processor and manages virtualized resources in the ad hoc data network. A slice controller is in communication with the control system processor and implements a network slicing scheme in the ad hoc data network. A network orchestration and operations controller is in communication with the control system processor and that generates control instructions for provisioning communications between the cube satellites in the ad hoc network.

In another aspect, the invention is a control and management layer for an ad hoc network of cube satellites that includes a plurality of multi-use cube satellites having both a network communication ability and sensing ability. At least one ground-based hub communicates with the plurality of multi-use cube satellites. An access gateway for energy constrained devices is configured to communicate with the plurality of multi-use cube satellites.

In yet another aspect, the invention is communications network that includes at least one central communications station that includes a fixed transceiver. Each of an ad hoc network of a plurality of mobile units is in motion relative to each other and each includes a mobile transceiver that is configured to communicate with each other one of the plurality of mobile units when the other one of the plurality of mobile units is within a predefined range of the other. The mobile transceiver of at least one of the plurality of mobile communications units is configured to communicate with the fixed transceiver. A control system is in communication with the fixed transceiver. The control system is configured continuously to determine a configuration of the ad hoc network and to communicate network control information for each of the plurality of mobile units so as to maintain communications between each of the mobile units in the ad hoc network. The at least one of the mobile units is configured to disseminate the network control information to other ones of the plurality of mobile units via the ad hoc network.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
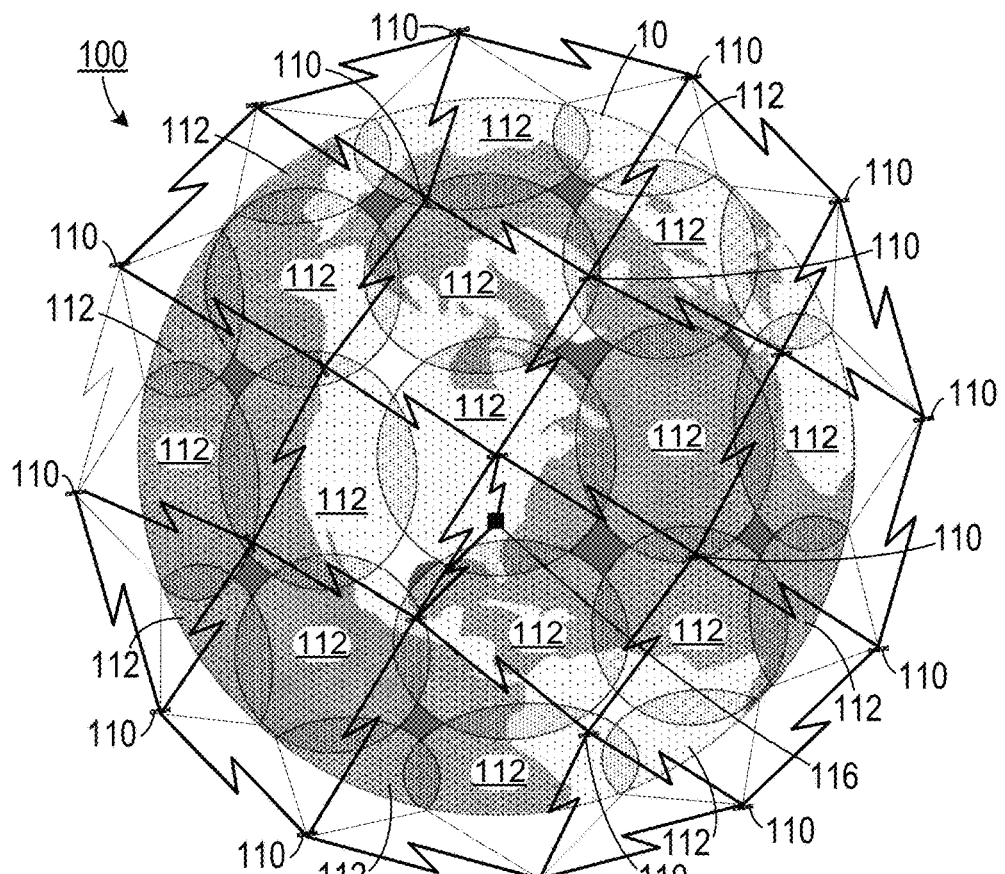
FIG. 1 is a schematic diagram showing one embodiment of a satellite-based communications network.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

An Internet of Space Things (IoST) can employ cube satellites (CubeSats) as a means to achieving global connectivity at low cost. Such an IoST can employ of software-defined networking and network function virtualization to provide effective control over the system hardware, improve network resource utilization, and simplify network management.

As shown in FIG. 1, one embodiment of a CubeSat IoST system 100 includes a space-based communications network in which a plurality of mobile units, such as orbiting satellites meeting the cube satellite standard (CubeSats) 110, form an ad hoc network around the earth 10 (or any other celestial body, depending upon the specific application). Each of the CubeSats 110 may be in a different orbit or may be in different positions along a single orbit. Each CubeSat 110 can have a sensor system or a camera that has an area of planetary coverage 112 and each is configured to communicate directly with any other of the plurality of CubeSats 110 that is within a line of sight. At least one of the plurality of CubeSats 110 is configured to communicate with the at least one ground station 116.

Figure 2:
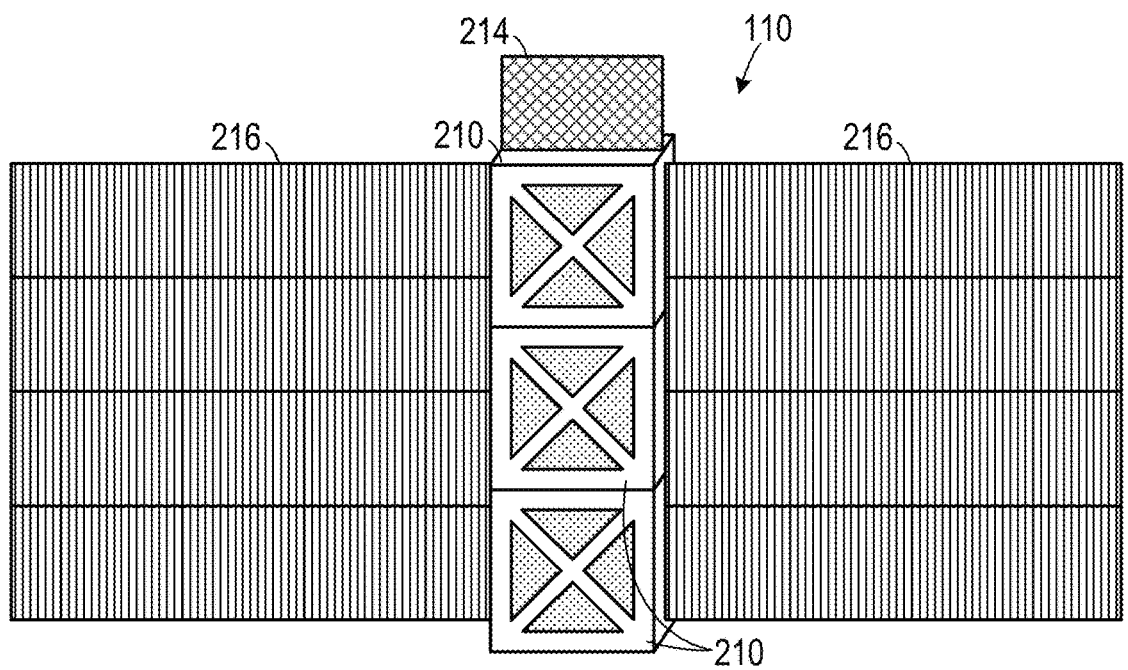
FIG. 2 is a schematic diagram of one embodiment of a cube satellite.

As shown in FIG. 2, a CubeSat 110 in the network includes a structure that conforms to the cube satellite standard, which includes one or more standard CubeSat units 210 in which each CubeSat 110 conforms to the size limitations of the CubeSat standard. (In which each unit has a 10 cm×10 cm×11.35 cm unit size and a mass of no more than 1.33 kilograms and in which multiple units can be connected to form a larger satellite.) Under the standard, the CubeSat 110 is powered either by batteries (not shown) or by a solar array 216. An antenna array 214 facilitates communications with other satellites and with ground stations. One embodiment of suitable antennas is disclosed in U.S. Patent Application Publication No. US 2017/0288316 A1, filed by Chattopadhyay et al., which is incorporated herein by reference.

The network can include mobile units of types other than CubeSats. For example, conventional satellites and earth-based or ground-based vehicles (such as ships, trucks, airplanes, etc.). The ad hoc network can include units with predefined ranges of each other (such as within line-of-sight or the operational limits of the on-board transceiver). In an exclusively earth-based system, the ad hoc network provides an advantage of allowing the mobile units to employ relatively low power transceivers and also to increase communications security through the use of limited range communications.

Figure 3:
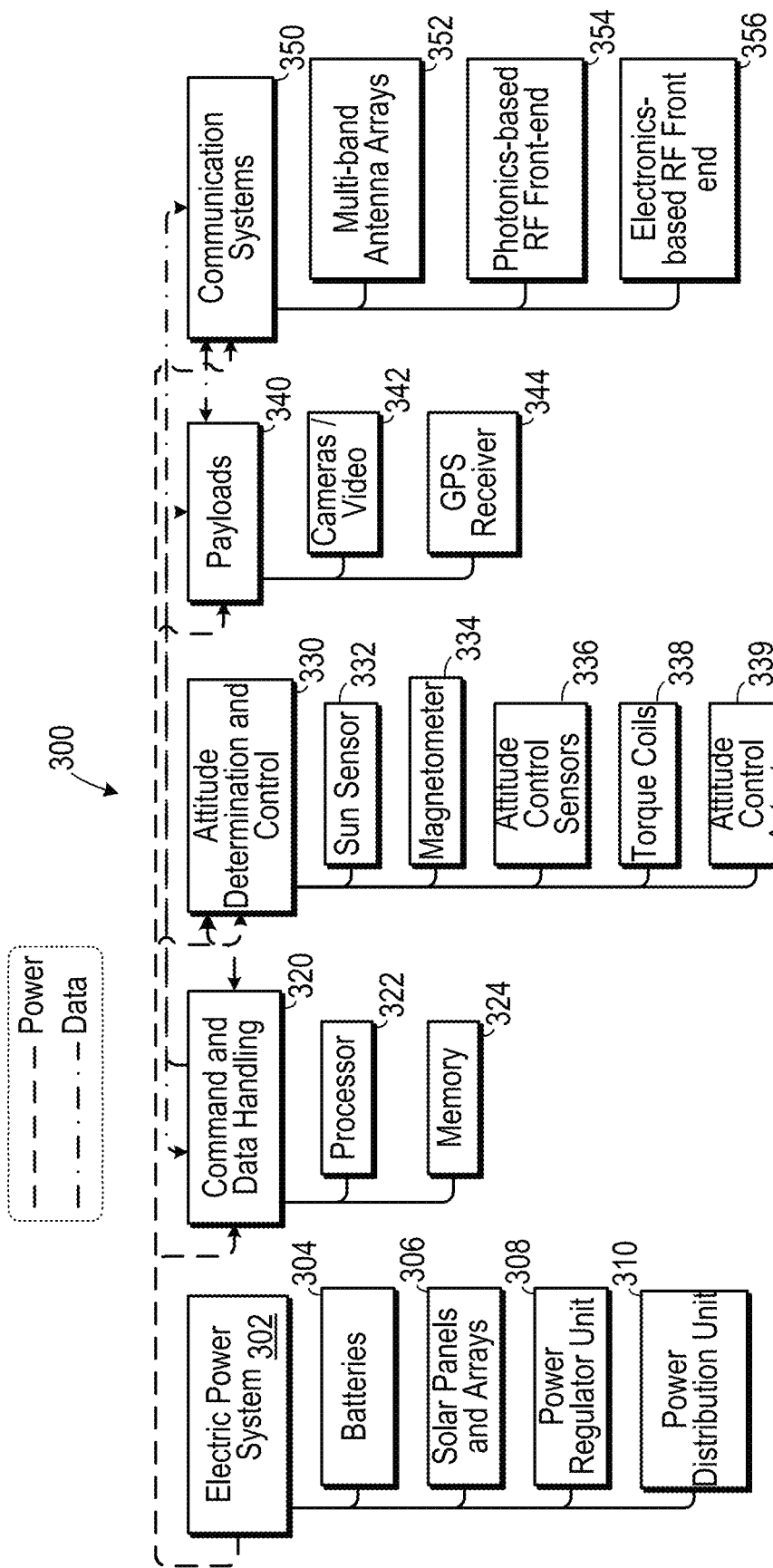
FIG. 3 is a block diagram showing one embodiment of functional components of a cube satellite system.

As shown in FIG. 3, the basic functional components suite 300 of the CubeSats includes: an electrical power system 302, a command and data handling system 320, an attitude determination and control system 330, a payload system 340 and a communication systems unit 350. The electrical power system 302 includes a solar power array 306, at least one battery 304 that stores power from the solar power array 306, a power regulator unit 308 that generates power signals for the elements of the satellite, and a power distribution unit 310 that controls distribution of power to the elements of the satellite. The electrical power system 302 powers elements of the CubeSat that are disposed within the structure.

The command and data handling unit 320 processes data received by the satellite. It includes a processor 322 and a computer-readable memory 324. All control data is sent from the command and data handling unit 320 and all sensor data is received by the command and data handling unit 320.

The Attitude determination and control unit 330 determines an attitude of the satellite with respect to a reference and that provides attitude data to the command and data handling unit. The attitude determination and control unit 330 can include a sun sensor 332 (or other celestial orientation sensor), a magnetometer 334, an attitude control sensor 336, etc., for sensing satellite orientation. The satellite's attitude may be controlled by one or more torque coils 338 or other type of attitude control actuator 339. The attitude control devices are responsive to the command and data handling unit 320, which applies power to the torque coils 338 in response to an attitude adjustment command received from the command and data handling unit 320.

A payload 340 performs a predetermined operation in response to a command from the command and data handling unit 320. Payloads 340 could include, for example, a surveillance camera 342, a GPS receiver 344, a remote sensing device (e.g., geomagnetism sensor, infrared sensor, etc.) or another such device.

The communications unit 350 effects communications between the command and data handling unit 320 and a remote entity. The remote entity could include at least one other cube satellite in the ad hoc network, an extra-network satellite or a ground station. The communications unit 350 can include a multi-band transceiver configured to communicate with another satellite along a line of sight. The multi-band transceiver typically would have a capability to communicate on a terahertz band. The communications unit can also include a multiband antenna array 352, a photonics-based RF front end unit 354 and/or an electronics-based RF front end unit 356. The transceiver employs the multi-band antenna array 352 to receive signals from other CubeSats in the network. The communications unit 350 is configured to communicate on multiple frequency bands, ranging from millimeter wave (30 GHz-300 GHz) to a terahertz band (300 GHz-10 THz).

Figure 4A:
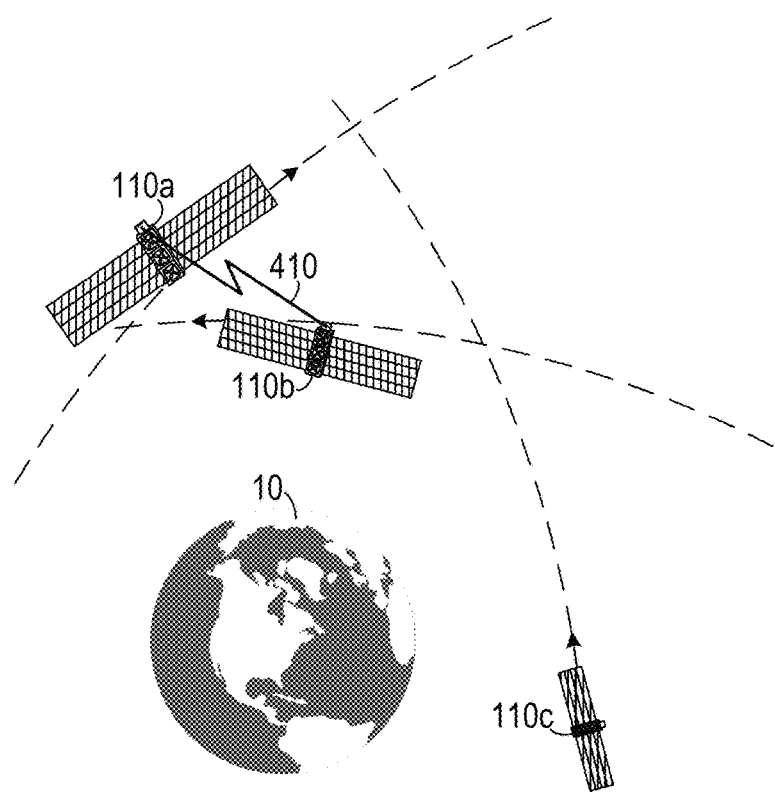
FIGS. 4A and 4B are schematic diagrams showing dynamic communication between cube satellites.
Figure 4B:
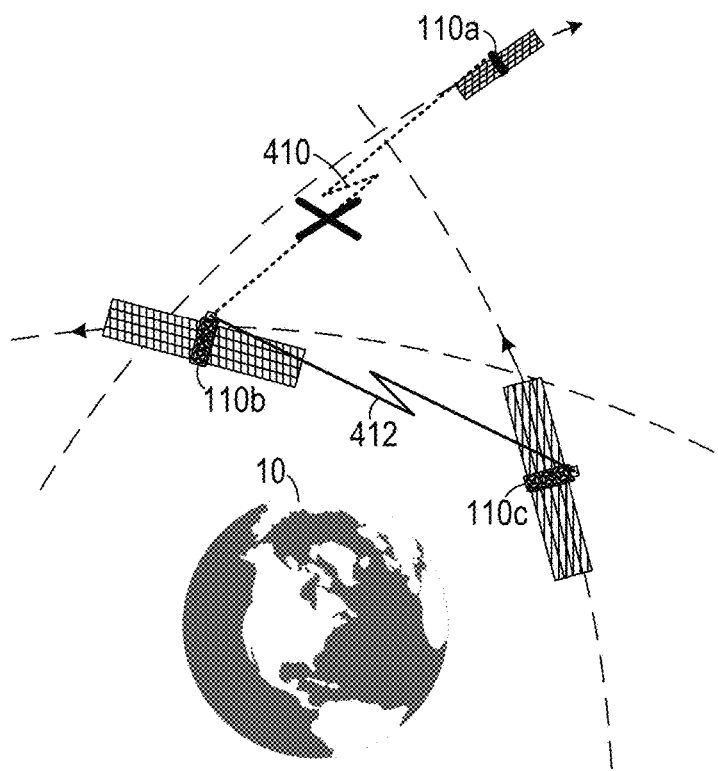

Dynamic communications between satellites in the network is shown in FIGS. 4A-4B, in which three satellites 110a, 110b and 110c orbit independently around the earth 10. At one point, satellite 110a is with a line of sight with satellite 110b, but not with satellite 110c. During this period, satellites 110a and 110b establish a connection 410 with each other. As the drift apart to the point of not being within line of sight, connection 410 is broken and as satellite 110c comes within line of sight with satellite 110a, a new connection 412 is established between the two.

Figure 5A:
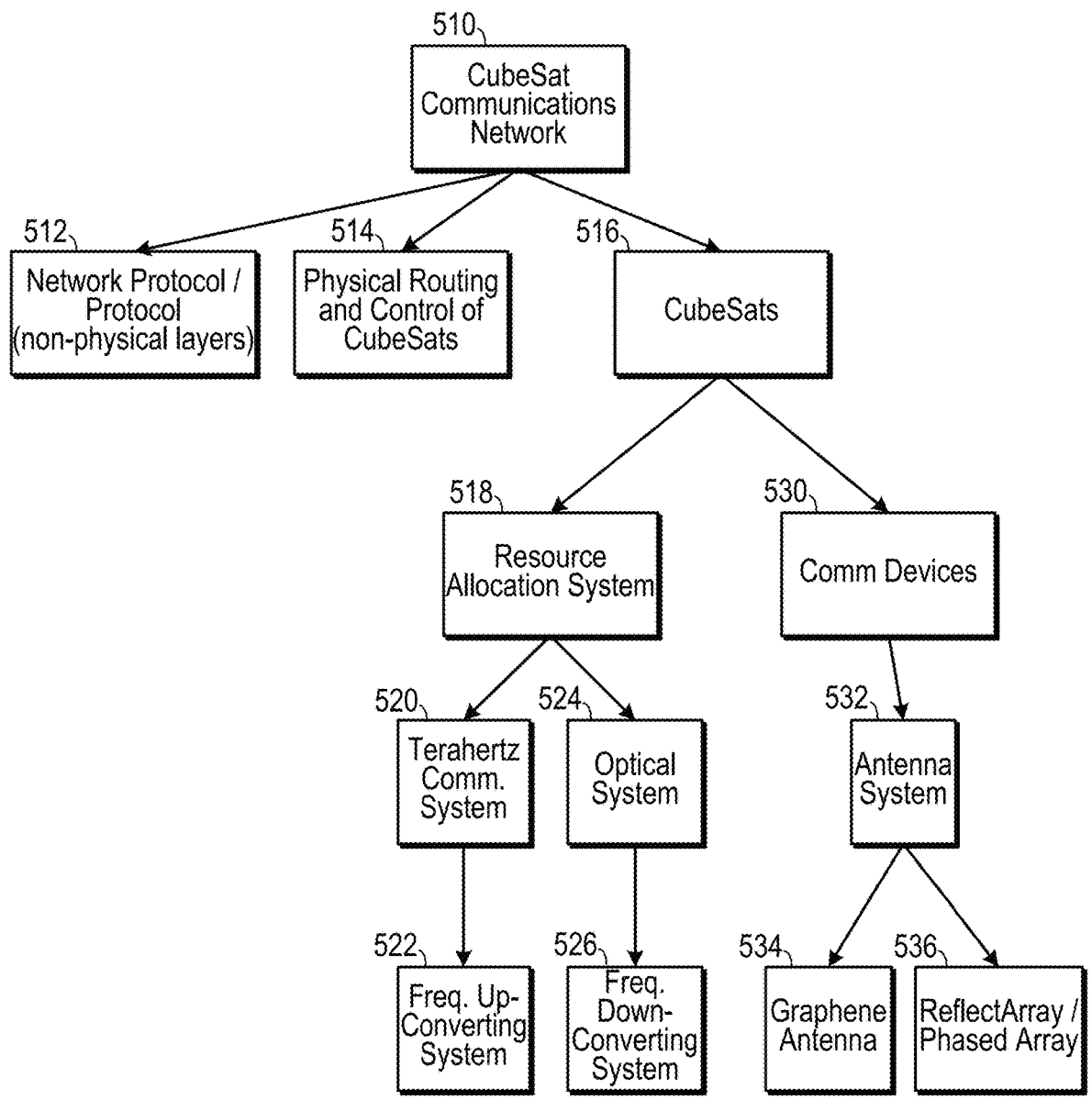
FIG. 5A is a block diagram showing communication layers of a cube satellite communications system.
Figure 5B:
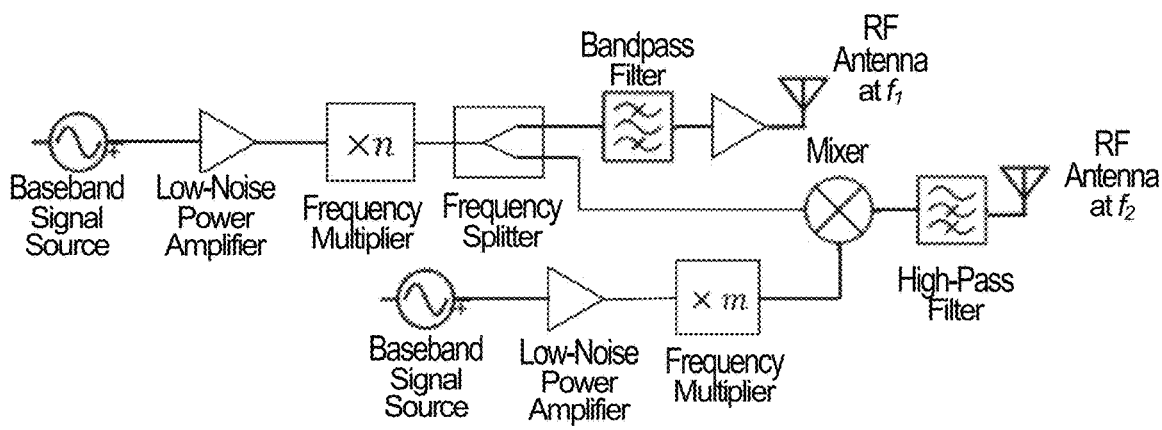
FIG. 5B is a block diagram of all-spectrum signal front-end by the electronics-based approach employed in the cube satellite communications system.
Figure 5C:
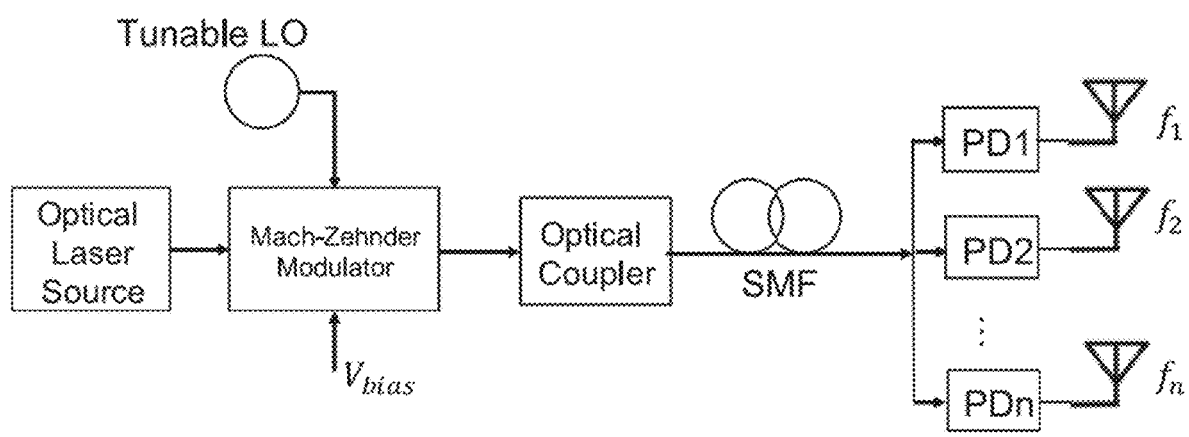
FIG. 5C is a block diagram of multi-frequency band front-end by the photonics-based approach employed in the cube satellite communications system.

One embodiment of a communications system employed by the CubeSats is shown in FIGS. 5A-5C. As shown in FIG. 5A, in one embodiment of a CubeSat communications network 510, a network protocol 512 sets forth the relationships between the non-physical layers employed in the system and a physical routing and control protocol 514 sets for the control commands for the CubeSats and lays out the dynamic networking instructions for each of the CubeSats. The CubeSat protocol 516 lays out control of the resource allocation system 518 and of the communication devices 530. A resource allocation system 518 protocol controls a terahertz communication system 520, which has a frequency converting system 522 that allows the satellite to convert incoming signals of one frequency to outgoing signals of a different frequency. The resource allocation system 518 protocol can also control an optical communications system 524, which can include a frequency down-converting system 526 that allows conversion of optical signals to radio frequency signals. The communication devices 530 can include an antenna system 532, which can further include a graphene antenna 534 (one such antenna system is disclosed in U.S. Pat. No. 9,825,712, issued to Akyildiz et al., which is incorporated herein by reference) for high frequency communications and a reflect array and/or a phased array antenna system 536 for highly directional communications.

With a view to further enhance the applicability of CubeSats to different use cases, a next-generation 3U CubeSat hardware design can support multi-band wireless communication at microwaves, mm-wave, THz, and optical frequencies can be employed. These CubeSats can provide important communications infrastructure for an Internet of Space Things (IoST). In an IoST, the CubeSats not only play the role of network infrastructure providing globally scalable connectivity, but also function as passive and active sensors of the physical world. Also, the closed-loop integration of CubeSat sensing and CubeSat communications results in a cyber physical system with many applications spanning ground, air and space. While IoST is different from IoS systems, additional connectivity provided by LEOs, MEOs, and GEOs, as needed, can be leveraged. Software-Defined Networking (SDN) and Network Function Virtualization (NFV) can be used as means to improve network resource utilization, simplify network management, and reduce operating costs. An SDN and NFV-based system architecture allows for a dynamic and scalable network configuration, integrated service delivery, logically centralized network control, and enables an IoST-as-a-Service (IaaS) paradigm. Certain features include: 1. A targeted set of applications that will benefit from IoST, in which IoST can serve a variety of different use cases and the different roles the CubeSats play in each; 2. Complete system architecture with component-level description; and 3. Solutions for tackling peculiarities of the space environment, including new concepts of Stateful Segment Routing (SSR) and virtual CSI (vCSI) that are geared towards overcoming challenges such as long delays, and temporal topological variations that are associated with operating in the space environment.

Many existing CubeSats have limited communication capabilities to ground infrastructure. The available frequency bands for communication are the S-band (2-4 GHz), C-band (4-8 GHz), X-band (8-12 GHz), Ku-band (12-18 GHz), and Ka-band (26.5-40 GHz). These frequency bands are also heavily utilized by other satellite communication and links between space shuttles and the ISS, as well as terrestrial wireless networks including IEEE 802.11 series, which can cause severe interference and thus degrade system performance.

The hardware design of next-generation CubeSats of the present invention can incorporate multi-frequency transceivers and antenna arrays used to support high-throughput inter-satellite and ground-satellite links used in CubeSat-enabled satellite applications. As shown in FIG. 5B, one design of a next generation 3U CubeSat meets the requirements of future CubeSat use cases and accommodate necessary subsystems and payloads. One embodiment employs a CubeSat with the dimension of 3U (10 cm×10 cm×34 cm) and a maximum weight of 5 kg. This design allows the antenna arrays to be stowed during launch and pre-deployment.

To overcome the spectrum scarcity and capacity limitations in current satellite networks, one embodiment employs multiple frequency bands, from RF to THz, and to optical frequencies, for next-generation CubeSat communication systems. For this, frequency-agile ultra-broadband reconfigurable systems able to communicate over the broad electromagnetic (EM) spectrum ranging from hundreds of MHz up to optical frequencies need to be developed. Between the two ends of the spectrum, the mm-wave and, especially, the THz-band frequencies can provide new opportunities for high-speed wireless communications. Due to recent progress in device development at these frequencies, it is possible to enable communication at such high frequency bands. While molecular absorption by oxygen and water vapor at mm-wave and THz-band cause heavy attenuation to signals on the ground, such effect does not exist in space because of the very low concentration of absorbing molecules above the atmosphere. Millimeter-wave and THz-band communication exhibit several key advantages over RF communications, including:

Thanks to the very large available bandwidth at mm-wave and THz frequencies, even very simple modulation and coding strategies can support from the start much higher bit-rates than existing RF systems;

Thanks to the small wavelength at mm-wave and THz frequencies, the size of antenna arrays can be significantly reduced. More antenna elements can fit per unit area of the array, enabling new massive and ultra-massive MIMO communication schemes.

Thanks to the directional propagation of mm-wave and THz frequency waves, interference between satellites is potentially much lower than at RF frequencies.

The use of optical communications for satellite networks can also be advantageous. Compared to optical frequencies, the mm-wave and, specially, the THz-band supports similarly large transmission bandwidths, which are mainly limited not by the physics of the channel, but by the speed of the electronic and opto-electronic components. Moreover, the much narrower transmission beams in optical systems further increases the alignment requirements between the transmitting and receiving satellite. In light of these observations, the THz band (0.1-10 THz) seems to offer a compromise be-tween RF (2-300 GHz) and optical bands (with typical bands of 850 nm/350 THz, 1300 nm/230 THz, and 1550 nm/193 THz). Ultimately, the spectrum may be used synergistically as needed. To enable a multi-frequency communication system, new transceiver architectures are employed. Three metrics weigh in the design of a reliable and efficient transceiver suitable to generate signals at various frequency bands for space communication and networking, namely, (i) dimension constraints, (ii) power source and energy consumption, and (iii) achievable performance. In particular, the dimension of the transceiver should follow the standard specified in CubeSat architecture. Besides the benefits of operating at mm-wave and THz-band frequencies, one additional advantage of operating in space is the fact that devices can be naturally operating at a low temperature, with-out the need of cooling components or cryostats. This can further lead to compact communication systems for CubeSats.

The system can employ two parallel approaches to realize the pro-posed multi-band transceivers, namely, multi-stream electronic up-converting chains and optical down-converting chains.

In existing systems, usually the final up-converted signals are used as the output and the intermediate products are discarded. However, by taking advantage of the intermediate frequencies, the system can leverage the up-conversion chain to generate multi-streams of signals to be fully utilized as carriers in the multi-band communication system. As demonstrated in FIG. 5B, one embodiment can use frequency splitters after frequency multipliers in order to extract the intermediate frequencies for outputs. The signal at frequency f 1 is considered as the intermediate output when producing signals at a higher frequency f 2. Similar structures can be cascaded to provide more output streams. The main components of the electronic transceiver include frequency multipliers, mixers, splitters, amplifiers, and filters. The function of frequency multipliers, which are usually implemented as chains of frequency doublers or triplers, is to increase the frequency of the local oscillator (LO) to the desired radio frequency or to an intermediate frequency (IF). Mixers combine two input signals to generate the output at the sum of their frequencies. Frequency splitters divide the input signal into two identical output signals for further processing. Amplifiers enhance the amplitude of the input signal, while filters, including bandpass and high pass filters, can eliminate unwanted harmonics to improve the spectrum efficiency. The structure leverages the state of the art in RF, mm-wave and THz transceivers, and can benefit from further developments.

Besides RF up-conversion to mm-wave/THz bands, there is also an additional approach to generate multi-frequency by down-converting optical signals which can fit in the limited space in IoST CubeSats while providing satisfying multi-band signal generation. As shown in FIG. 5C, components of the photonics-based approach include a laser signal source and a Mach-Zehnder modulator. With similar ideas of taking advantage of the multi-stream signals, multi-band signals can be generated by the approach of heterodyning two input signals with a Mach-Zehnder modulator, thus producing an RF signal with a frequency equal to the difference between the two inputs as the final output, while maintaining the two input signals also as two output streams. With a tunable LO, multi-frequency band signals can be generated as the output. Additionally, the stability of the photonics-based RF signals is dependent on the stability of the laser sources. There-fore, in the CubeSat design, mode-locked lasers may be preferred to generate stable signal source. Then a single-mode optical fiber is used to deliver the down-converted signal to the antenna side.

Figure 6:
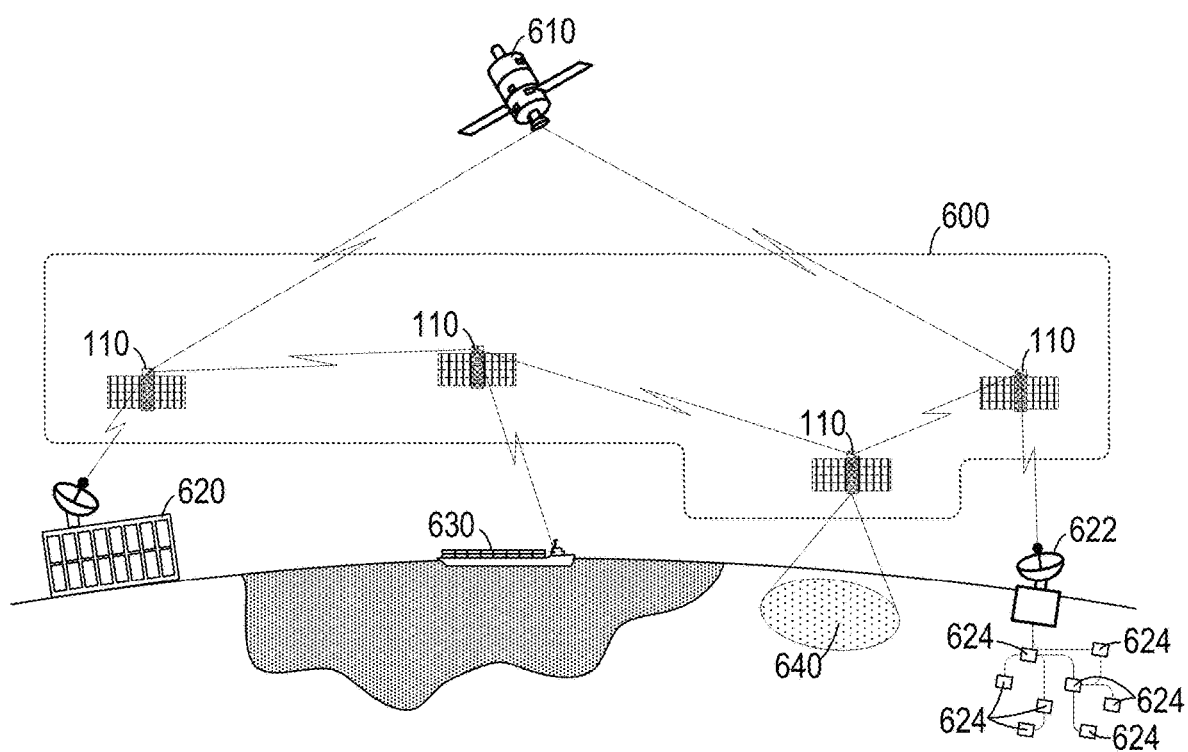
FIG. 6 is a schematic diagram showing a cube satellite network in communication with existing infrastructure.

As shown in FIG. 6, one example of the physical architecture employed in IoST includes: at least one ground station 620 for providing network control and communications, a plurality of IoST Hubs 622, on-Earth and near-Earth sensing devices 624, and a CubeSat 110 network 600. The IoST Hubs 622 communicate with the CubeSats 110 and house a large portion of control framework for the entire network, whereas the CubeSats 110 operate in the exosphere (altitudes of 500 km and above) forming the network 600 in space to receive, transmit, and relay data efficiently. Remote entities 630, such as ships at sea and people in remote areas, can communicate with the network 600 because of its extensive coverage. CubeSats 110 can be configured with remote sensing devices to provide information about specific regions 640 on the earth. Also, CubeSats 110 can communicate with other satellites 610, such as high earth and geosynchronous orbit satellites for specific purposes.

While passive sensing provides monitoring and reconnaissance capabilities, the IoST Hubs 622 and active sensing applications can utilize the CubeSat network 600 as a backhaul. Together, they can work in tandem to achieve an integrated cyber-physical system. In more general terms, the application scenarios of IoST can be divided into several categories based on functionality, including: (1) monitoring and reconnaissance, (2) in-space backhaul, and (3) cyber-physical integration.

Figure 7:
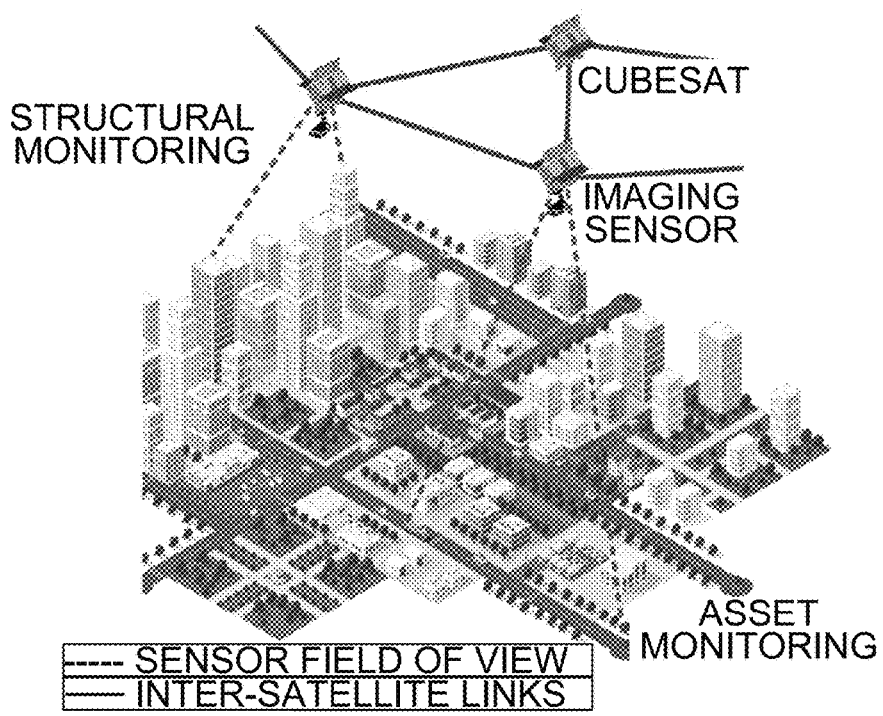
FIG. 7 is a schematic diagram showing a cube satellite network in communication with urban infrastructure and configured for monitoring and reconnaissance applications.

As shown in FIG. 7, CubeSats can have an extensive role to play in aerial reconnaissance and monitoring. The use of imaging sensors, such as multi-resolution cameras that can capture infra-red, visible, and ultra-violet images is central to applications relating to terrain monitoring, and disaster prevention and monitoring, to name a few. More specifically, in areas susceptible to earthquakes, such as in California and Nevada in the U.S., buildings, bridges, tower cranes, and other highly elevated constructions need to be monitored to ensure their stability. Imaging and structural monitoring sensors can detect signs of sinking and tilting in buildings at risk. The system can be employed in terrain monitoring and disaster prevention applications. Additionally, the CubeSats in IoST can also be equipped with sensors for environmental monitoring. For example, they could be used to monitor movement of an oil spill or an active volcano to track lava flows.

Figure 8:
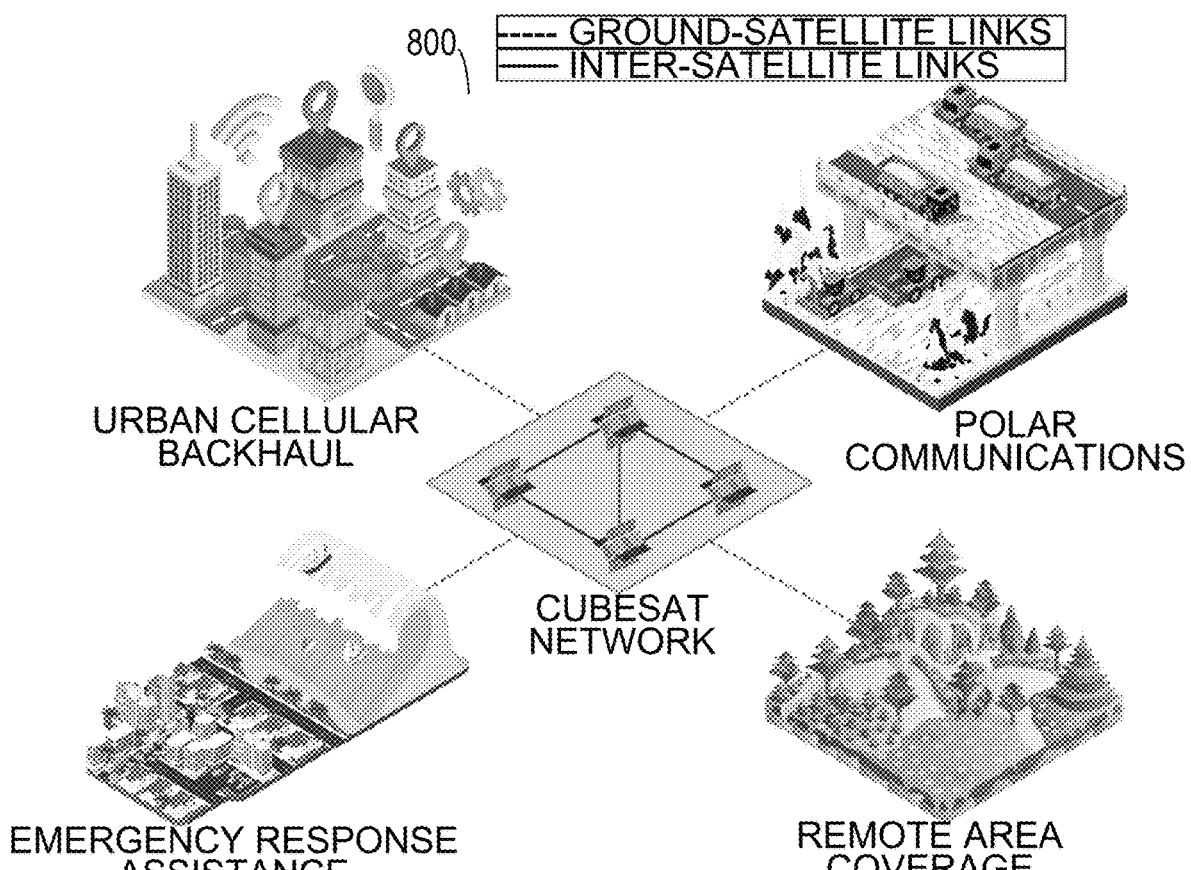
FIG. 8 is a schematic diagram showing a cube satellite network in communication in certain special environments.

As shown in FIG. 8, IoST can provide an in-space backhaul 800 for data reporting and forwarding between CubeSats and/or ground infrastructure. Existing communications networks cover most areas on the earth and provide high-speed Internet services to users. However, in remote areas where user density is much lower or even zero, many cellular carriers and Internet service providers largely disregard investing in infrastructure construction and maintenance. End-users in such areas also do not expend the considerable costs associated with facility construction and extra service charges. Employing IoST, connections can be realized through CubeSat networks, which do not necessarily require ground infrastructure, thus saving both construction costs as well as helping preserve the natural landscape. While some existing solutions also provide satellite backhaul connectivity, higher reconfigurability and scalability have not been considered and implemented so far. Thanks to the multi-band connectivity the next-generation 3U CubeSats, high-speed reliable service can ensure minimal latency for the in-space backhaul network. Additionally, new M2M applications in remote areas can also rely on IoST as a backhaul in space to track and manage just-in-time inventories, enterprise fleets, energy grids, remote infrastructure, emergency operations, personnel deployments, natural processes, and more. For example, in the North and South Poles, where currently satellite coverage may be intermittent, the scientific, operational, and weather data collected from measurement equipment can be transferred to CubeSats in IoST and forwarded to data processing centers in a timely manner. IoST can also send commands from control centers to the equipment to change operation modes or perform necessary measurements. Moreover, the connectivity of IoST can also be leveraged in non-remote areas where emergency connections are needed, such as in areas affected by earthquakes, tsunamis, or tornadoes where ground infrastructure might be subject to damage. Furthermore, in the context of network security, wherein terrestrial infrastructure is vulnerable to compromise, the remote and flexible configuration of IoST can serve as a secure secondary backhaul.

Figure 9:
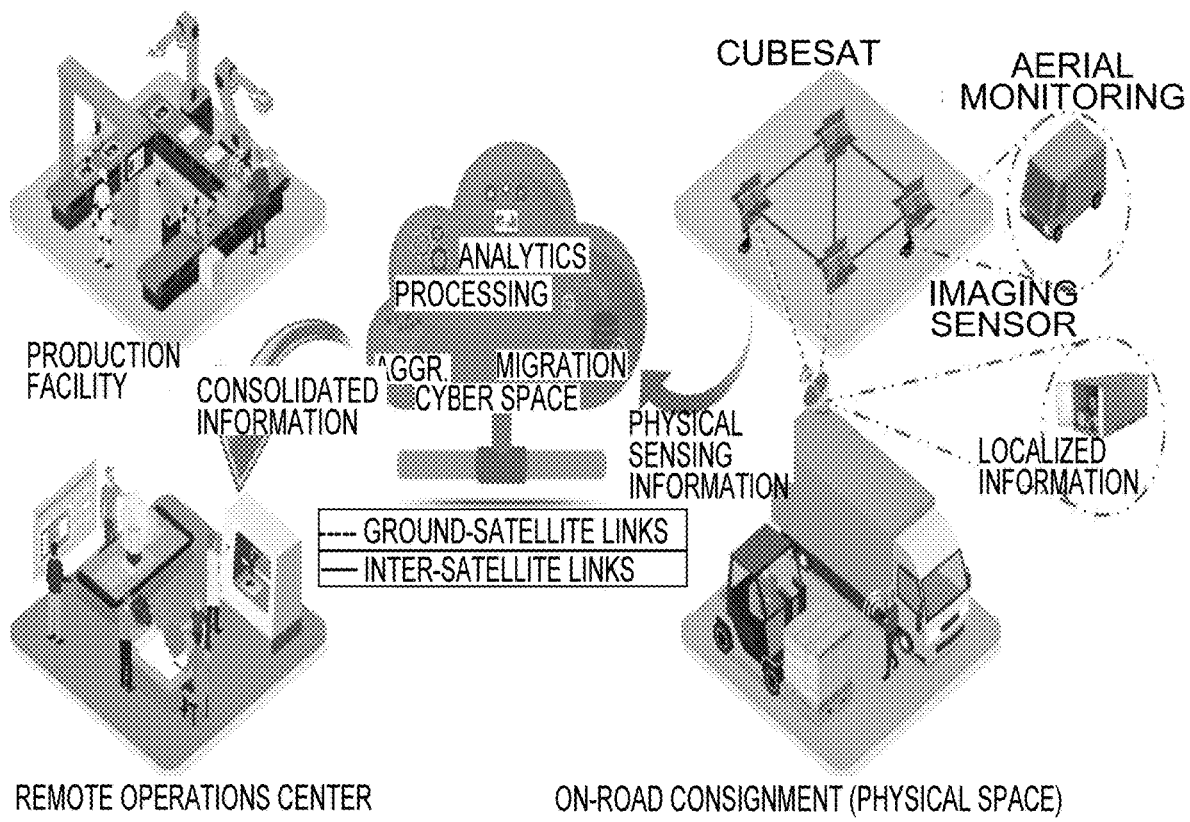
FIG. 9 is a schematic diagram showing a cube satellite network in communication in certain industrial applications.

Currently, existing sensor networks on earth and in space tend to be isolated in terms of sensing and data collection, among other functionalities. Nevertheless, a fully integrated system should coherently combine and utilize both local and remote sensors. For example, in autonomous driving, satellite imaging combined with local in-vehicle sensors can achieve optimal global routing and traffic monitoring. In addition to intelligent transport in urban areas, cargo transportation systems across both land and sea routes can exchange data with CubeSats. For example, in transport of fresh food or flowers, the most important factor is the time of arrival to the destination and the freshness of the goods upon arrival. However, both metrics are difficult to monitor especially when the trucks are constantly moving. Utilizing the benefit of our low-orbit CubeSat network, IoST can keep track of all in-transit consignments by requesting data from local sensors in trucks and then forwarding the data to the freight carriers' database, as shown in FIG. 9. The sensors in CubeSats can also provide information about road and weather conditions to the truck drivers. Moreover, the integrated service can also enhance the performance of Unmanned Aircraft Systems (UAS), such as drones and balloons, in applications including Internet access for underdeveloped areas, aerial photography, product deliveries, surveillance, and so on. IoST can coordinate these drone swarms in order to improve the overall network performance. For example, for drones operated by different owners in the same area, it is important to have a coordinator to help them sense the trajectories of each other to avoid collisions. The controllers on the ground have limited sights because of obstructions, whereas the IoST CubeSats with their more global Field of View (FOV) are better suited to assist in coordination tasks. Specifically, such coordination tasks involve CubeSats' passive sensing of aircrafts in their FOV, active reporting of localization information to each other, and instructing altitude data to drones as well as ground infrastructure.

In one embodiment, CubeSats can also be designed for deep space applications. In the context of deep space applications, IoST can be used for interplanetary data relaying, sensing and monitoring on asteroids, Mars, and the Moon, as well as even farther into the depths of space.

The following discusses system architecture design. Ideally, the Software-Defined Networking (SDN) paradigm separates the control plane from the data plane (also known as the forwarding plane) and introduces advanced network control functionalities based on an abstract representation of the network. Through SDN, network control logic is deployed in a logically centralized entity known as the network controller. Implicit in the separation of the control and data planes is a need for a Southbound Interface (SBI) between the two planes, and a Northbound Interface (NBI) that provides an abstract network view to network control applications. Complementary to SDN is the concept of Network Function Virtualization (NFV); NFV decouples specific network functionality from specialized hardware and implements the same via software on "whitebox" hardware. It also provides an advantage in provisioning multiple isolated networks over the same physical infrastructure. A combination of SDN and NFV vastly simplifies network deployment and operation, and enables independent evolution of both hardware and software, allowing for flexible adoption of emerging technologies in both domains.

The use of SDN/NFV can simplify network management. More specifically, in the context of satellite networks, the ground stations and satellites follow highly vendor specific implementations, and consequently the "closed" nature of hardware and software can hamper network evolution. Also, in order to realize a truly cyber-physical system, the CubeSat transport network should be tightly integrated with the different application scenarios; considering a remote monitoring example, this integration could take the form of joint optimal routing over both the sensor field and the satellite network, which may not be possible in traditional network setups. Advances in satellite infrastructure design with the CubeSat concept can also serve as key drivers in enhancing the feasibility of SDN in the space segment. The availability of high-quality off-the-shelf components and relatively low-cost launch facilities makes CubeSat deployment increasingly cost effective. Also, the computing hardware in CubeSats can be built completely from commercial Off-the-Shelf (COTS) components. The use of CubeSats also allows infrastructure providers to significantly lower their deployment and operating costs in comparison to traditional satellite networks. Similar to white box switching hardware common in wired SDN/NFV networks, the use of COTS hardware and limited onboard processing capability make CubeSats well suited for the data forwarding component of the network, i.e., the data plane.

Figure 10:
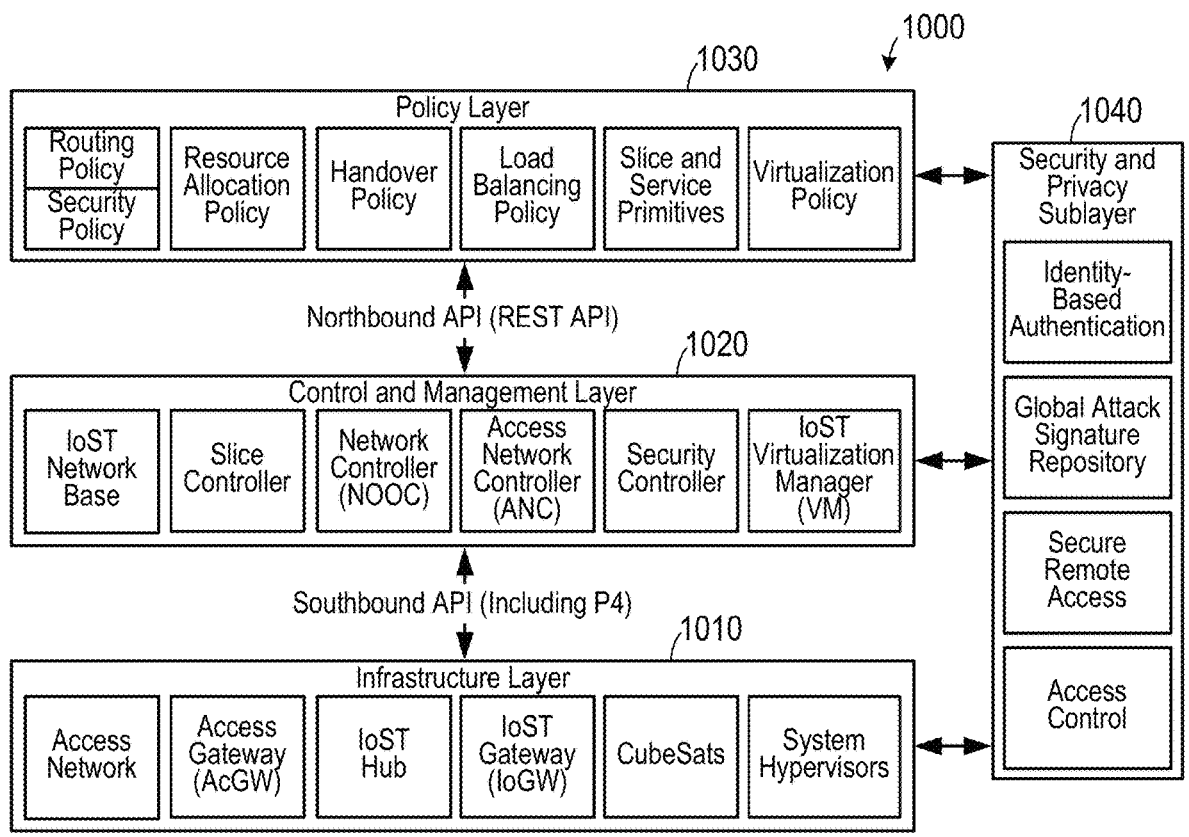
FIG. 10 is a block diagram showing one embodiment of Architecture Layers employed in an IoST control system.

As shown in FIG. 10, through the use of SDN and NFV, IoST incorporates certain features. These include network scalability: The logical centralization of control capabilities offered by SDN allows for intelligent routing of massive amounts of traffic by ensuring optimal utilization of network infrastructure thereby meeting the strict Quality of Service (QoS) requirements of a variety of applications. The applications can also exercise control over network policy through their interaction with an abstracted version of the underlying infrastructure. The centralized control of data flow offered by SDN/NFV further enables and simplifies data aggregation. IoST-as-a-Service (IaaS): Emerging and growing applications, such as environment monitoring, smart grid, smart city, smart transportation, e-health, smart home, and remote sensing require highly differentiated networking capabilities to be integrated and deployed over the same network infrastructure. The network virtualizability of IoST allows CubeSats and other sensing devices to be treated as a service rather than as a physical asset. The infrastructure operator and service provider can exist as two different entities. IoST provides service providers with the ability to control, optimize, and customize the underlying infrastructure without owning it or interfering with the operations and performance of other tenants, thus leading to cost-efficient operations and enhanced QoS. Such multi-tenancy is implemented through network slicing that ensures resource isolation between tenants. Ubiquitous connectivity: IoST is expected to bridge diverse technologies to enable new applications by connecting physical objects, vehicles, appliances, devices, buildings, and so on to a diverse set of endpoints both on as well as near-Earth. IoST includes support for different environments namely the terrestrial, underwater, and underground domains, augmenting endpoints in each with satellite transport. Network security: Since SDN and NFV centralize the network management and control, they will be able to handle the network security at different layers efficiently. Further, as SDN and NFV profile each flow differently, they can manage the traffic from various services which have different security profiles. This would ease the additional processing of less secure applications. IoST implements an identity-based authentication scheme, and robust access policy framework for protecting the Control and Management Layer from unauthorized access and establishing trust primitives. Security is built into the IoST architecture, as well as delivered as a service to protect the availability, integrity, and privacy of all connected resources and information.

In order to guarantee control and data plane separation, the IoST architecture of the network control system 1000 follows a layered structure as shown in FIG. 10 and includes the following:

An Infrastructure Layer 1010 that represents the physical hardware in the network such as sensing devices, switches, gateways, servers, and CubeSats, along with hardware virtualization solutions;

A Control and Management Layer (CML) 1020 that is responsible for overall network orchestration, operations, and management. In SDN and NFV parlance, the CML 1020 is analogous to the control plane, and management and orchestration entity. The CML 1020 includes a Security and Privacy Sublayer 1040 that handles network security.

A Policy Layer 1030 that allows external entities to interact with the IoST system. It provides tenants with a way to push their network policies, as well monitor as network status. Together, these layers enable a dynamic and scalable network infrastructure, resource virtualization, the integration of heterogeneous services and technologies, and the provisioning of security and privacy. The Policy Layer interacts with the CML 1020 through a RESTful NBI, while the SBI between the CML 1020 and infrastructure layer 1010 makes use of the protocol independent P4 language where feasible.

Figure 11:
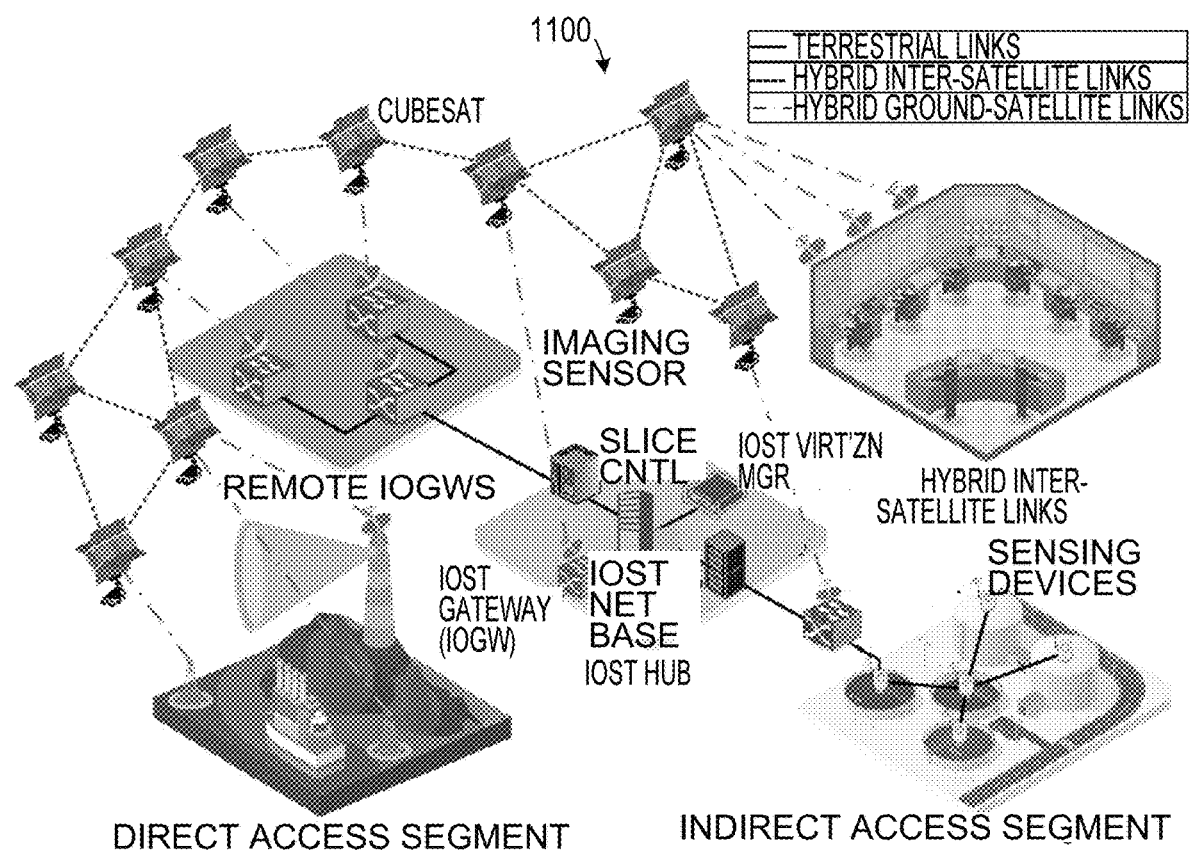
FIG. 11 is a schematic diagram showing infrastructure employed in one embodiment of a cube satellite network.

An overall view of the system 1100 is shown in FIG. 11, which shows both terrestrial, as well as near-Earth applications. The Infrastructure Layer forms the underlying physical fabric of the system. It includes the sensing devices, switches, gateways, and servers that form the Access Network and IoST Hub, in addition to the CubeSats. The Infrastructure Layer also includes hypervisors operating under the umbrella of an IoST Virtualization Manager (IVM) which are responsible for hardware virtualization that makes network function deployment and management seamless in the control system.

Returning to FIG. 10, the Access Network control system 1000 is characterized by the presence of a virtual sensor network that serves as the data source. Within the context of IoST, sensing devices can belong to one of three categories: (i) the direct access segment, (ii) the indirect access segment, and (iii) the near-Earth segment. Sensing devices that can communicate with CubeSats directly form the direct access segment. The direct access segment is well suited for applications wherein data transfer is intermittent, and the devices themselves are not power constrained. In the absence of additional ground infrastructure, one of the sensing devices itself functions as a cluster-head providing localized control for the sensor field. For example, in freight transportation systems, the sensors that monitor consignment temperatures do not need to transmit data continuously and have a ready power source available from the vehicle. In addition to low data volume applications, the direct access segment is also useful in areas where ground infrastructure deployment is not feasible. Energy constrained devices that are not suited for direct communication with the CubeSat network form the indirect access segment. The indirect access segment can be characterized by the presence of an Access Gateway (AcGW) which aggregates the data, and either forwards it directly to the CubeSats or through the IoST Gateway (IoGW). The use of the IoGW is particularly useful when the IoGW is physically close to the AcGW, because: (i) additional delay is negligible due to physical proximity, and (ii) control traffic is minimized due to pre-processing of the traffic at the IoST Hub. The indirect access segment is well suited for underwater sensing applications, for example, where the sensing devices are energy constrained, and recharging is difficult. In such scenarios, the buoys on the ocean surface can serve as AcGWs, forwarding data to the CubeSats.

Aerial reconnaissance and monitoring applications can make extensive use of CubeSats augmented with sensing payloads, thus forming the near-Earth segment. The near-Earth segment is unique in that it makes use of CubeSats for both sensing as well as communication. The IoST architecture provides the flexibility of using different segments in tandem, providing a holistic data collection framework. The devices leave the decision-making to the CML by interacting with it through standardized interfaces, i.e., the SBI. For example, the data-forwarding function is controlled by a set of match and action tables. In this way, it is possible to set up customized actions on the different devices to implement firewall, packet classification, and load balancing functionalities in the data plane. Further, the P4 operations-configure and populate are carried out by the CML, in tandem with the Policy Layer.

IoST Hubs represent the ground stations in IoST. To maintain robust connectivity with CubeSats, they can be distributed globally across data centers. A typical Hub implementation includes the IoGW, along with network control infrastructure such as the IoST Network Base, the IoST Virtualization Manager (IVM), Slice Controller, the Network Operations and Orchestration Controller (NOOC), and the Security Controller. An IoST Hub can have multiple distributed IoGWs attached to it, all of which may not be active simultaneously. In this manner, an IoST Hub serves as a point of interconnection between the terrestrial Access Network and the CubeSat constellation. By virtue of housing the control and management entities, the IoST Hubs also enable interactions with tenants, and other stakeholders.

CubeSats form the primary data forwarding component of the IoST system. Depending on the application, the CubeSats may perform only the forwarding function, or take part in both sensing and data collection. Owing to the limited processing capacity of these small satellites, they may be devoid of control logic, instead receiving control directives from the CML. The IoST architecture incorporates a great deal of flexibility which allows the deployment to be tailored to a specific application, if required. Certain elements of the infrastructure layer depend on the nature of the application, i.e., for the indirect access and near-earth segments, an AcGW is not required.

Virtualization of hardware resources forms an important aspect of the Infrastructure Layer. Within IoST, there can be three primary classes of hardware: (i) classical hardware-computing resources in servers and switches, (ii) virtual sensor networks-computing and radio resources in sensing devices, and (iii) CubeSat networks-computing and radio resources in CubeSats. The system can employ network hypervisors that provide more than one networking context per physical networking device to allow for the provisioning of differentiated services, such as FlowVisor and its extensions, HyPer4 and HyperV hypervisors for virtualizing P4-based switching hardware.

Virtualization in the sensor space has been motivated by the proliferation of multi-function sensing devices and the corresponding need for concurrent execution of multiple applications. To this end, RIOT OS is a promising solution under active development that brings real-time multi-threading support to resource constrained sensors, along with a full TCP/IP stack with 6LoWPAN support.

In keeping with the Management-Control Continuum (MCC), IoST does not differentiate between the management and control entities. Instead, the CML is responsible for network control, management, and performance optimization. The CIVIL interfaces with the Policy Layer that guides its functioning and the system elements that come under the purview of the CML include both the Access as well as CubeSat networks.

Deployed at the IoST Hub, the IoST Network Base is the network database that stores and maintains network status information. Specifically, for the CubeSat network, it stores information relating to:

Ground-to-satellite Links (GSLs): IoGW-CubeSat ID pair, band of operation, link capacity, link utilization, packet error rate, MCS, SNR, transmission distance, and propagation delay.

Inter-Satellite Links (ISLs): CubeSat ID pair, band of operation, link capacity, link utilization, packet error rate, MCS, SNR, transmission distance and propagation delay.

CubeSats: CubeSat ID, orbital plane ID, orbital altitude, computational capacity, computational load, and azimuth and elevation angles.

Orbital Plane: Orbital plane ID, altitude, inclination, longitude of ascending node, and eccentricity. For, the Access Network, it holds the following information: sensing devices, location, energy level, computational capacity, and computational load.

Access Links: Band of operation, MCS, packet size, packet error rate, transmit power, and link delay. With respect to the Hub itself, the following associated information is stored in the network database: IoST Hub: Hub location, computational load and capacity, associated CubeSats, and associated IoGW and GSLs.

Network Slice: Slice ID, tenant ID, Service Level Agreement (SLA), bands of operation, and computing resource requirements (memory, processing and storage).

The IVM manages the operation of the system hypervisors and makes virtualized resources available to the Slice Controller and NOOC. The mapping of physical resources to virtual entities and the associated lifecycle management fall under the purview of the IVM.

IoST implements support for multi-tenancy through network slicing. More specifically, through network slicing, we seek to deploy services with differing SLA requirements over the same physical infrastructure, in an end-to-end manner, i.e., the slice definition remains consistent from source to destination. At the infrastructure level, support for slicing comes from multi-function sensors, CubeSats with multiple sensing payloads, and the Access and CubeSat networks over which multiple isolated networks can be deployed. Within IoST, a slice is uniquely identified by its Slice ID, and is characterized by its SLA, radio resource, and computing resource requirements. The slice-service relationship is modeled by a one-to-many relationship, with there being multiple possible services associated with each slice. Accordingly, resource allocation between slices is a vital network management primitive necessitating the need for a slice-neutral Slice Controller. The Slice Controller is deployed at the IoST Hub and receives the slice definition from the Policy Layer over the NBI, which it stores in the IoST Network Base. When one or several slices are required to be deployed as indicated by the Policy Layer, the Slice Controller fetches the slice information from the network database and then allocates infrastructure resources among the slices. The Slice Controller can be viewed as an intra-slice resource manager that guides the functioning of the IVM, instructing it to allocate non-conflicting virtual resource sets to different slices.

Network Orchestration and Operations Controller (NOOC): While the Slice Controller handles orchestration primitives only, in keeping with MCC, the NOOC deals with both network orchestration and network control. Once the Slice Controller allocates a subset of the available resources to a slice, a NOOC instance at the IoST Hub belonging to the tenant takes over the lifecycle management of network functions within that slice, performing instantiation, scale-out/in, performance measurements, event correlation, and termination. Therefore, the NOOC works in close cooperation with the IVM, and Slice Controller, ensuring elasticity and optimal resource utilization. For example, the NOOC instance can request the Slice Controller to scale up or scale down the resources allocated to a slice based on the immediate requirements of the services utilizing that slice. On the other hand, the NOOC also guides the placement of network functions on the underlying infrastructure through its interactions with the IVM. Thus, intra-slice resource management is one of the key aspects of the NOOC. In terms of network control operations, the segment of the network beyond the AcGW, through the IoGW and including the CubeSat network is under the control of the NOOC. The principal functionalities of the NOOC under the network control realm involve the following:

PHY Layer Functions: Selection of frequency band, channel bandwidth, modulation and coding scheme (MCS), transmission power and number of antennas for Cube-Sats.

MAC Layer Functions: QoS and channel aware prioritization and scheduling.

Network Layer Functions: Setting the optimal packet size and providing a list of RX candidates to choose from for transmission at each hop within the CubeSat network.

The Access Network Controller (ANC) is responsible for the Access Network leading up to the AcGW, i.e., it primarily exercises control over the indirect access segment sensing devices. The ANC is co-located with the AcGW and works in close cooperation with the IoST Network Base. In a manner similar to the NOOC, the ANC's functions can be categorized as follows:

PHY Layer Functions: Setting the MCS and transmission power while operating under an error rate requirement constraint.

MAC Layer Functions: Packet scheduling and prioritization and optimizing sensor sleep schedules.

Network Layer Functions: Packet size optimization, and routing within the sensor field. As is apparent, a slice is provided with an ANC instance only in the event of having a indirect access segment. In the near-Earth case, the ANC's functions are taken up by the NOOC, since it controls the CubeSat network. Since each ANC is augmented with an AcGW, an ANC instance is responsible for a single Access Network. By eschewing a physical centralized control solution, and delegating control processing within the Access Network itself, we help alleviate scalability issues arising from congestion at the IoST Hub or associated IoGWs in the event of increased control traffic arising from a large number of devices. Incorporating such flexibility in the architecture allows IoST to adapt to different application scenarios while still maintaining the same generalized architectural framework.

The Security Controller is deployed at the IoST Hub and incorporates the Security and Privacy Sublayer. The Security and Privacy Sublayer resides in the Security Controller which itself is a part of the CML. It interacts with all three layers, i.e., Infrastructure, C M L, and Policy, and protects the availability, integrity, and privacy for all connected resources and information. Specifically, to protect the communications throughout the entire system and to ensure all trusted devices/data are operated/processed in a secure manner, the IoST architecture uses an identity-based networking service that utilizes flow rules to profile incoming traffic. Particularly, the IEEE 802.1X protocol is implemented for port-based network access control, and a combination of Kerberos and LDAP is utilized for authentication along with an access control server at the Security Controller that implements the Diameter protocol. The Security Controller also implements an Intrusion Detection System (IDS) that uses both signature-based detection via a global attack signature repository, and anomaly-based detection that detects unusual traffic behavior.

While it interfaces with the IoST architecture over the NBI, the Policy Layer is not part of the core system and is treated as an external entity. Each tenant, or service provider that makes use of IoST infrastructure has its own Policy Layer that shapes control decisions. The Policy Layer has access to the IoST Network Base, which provides it with an abstracted view of the network state. It issues policy directives to the CML over the NBI, and the CML incorporates the policy while formulating network control strategies. An example of a policy directive could be avoiding a specific route in the CubeSat network because of higher monetary costs associated with it, or restrictions on the nodes over which the NOOC can instantiate network functions, in terms of location and resource utilization levels. The system can rely on the adherence of the layer implementation to a standardized NBI. In this manner, IoST can handle a variety of tenant requests in a service-oriented manner. Further, access to the IoST Network Base over the NBI allows service providers to customize data acquisition that can be then used for analysis of network trends that are fed back to the policy framework.

Unlike terrestrial wireless networks, the space environment is characterized by long propagation delays and an ever-changing network topology. Consequently, a variety of terrestrial SDN concepts are rendered sub-optimal in their applicability to IoST, and there is a need for novel solutions to tackle the unique challenges faced by the system.

The need for resource allocation techniques that jointly optimize across the physical and link layers is born out of the large number of parameters that characterize a transmission link in IoST-frequency bands, number of antenna elements, MCS options, and transmission power and bandwidth. Further, the global presence of IoST gives rise to many simultaneous flows, necessitating the need for a link scheduling algorithm that can achieve throughput optimality. In addition to the computational complexity associated with cross-layer optimization, within the context of IoST, resource allocation faces two major challenges: (i) the aforementioned complications arising from the space environment, and (ii) absence of control capabilities on the CubeSats. Further, unlike terrestrial networks, where there is only a single layer of wireless access nodes (for example, Remote Radio Heads or Distributed Units), in IoST the entire network is wireless, and therefore resource allocation must be done at each hop, adding to the problem. Since the NOOC on the ground must perform resource allocation for the CubeSats in space, the absence of real-time Channel State Information (CSI) at the NOOC poses a challenge. Owing to limited on-board processing on CubeSats, the system employs joint physical-link layer resource allocation augmented with virtual CSI (vCSI) in IoST. In a vCSI-based approach, the NOOC runs a simulation of the IoST system which in turn makes use of prediction algorithms to generate vCSI. Then, the NOOC makes use of the generated vCSI as the basis for its decisions. Further, the vCSI prediction is periodically augmented with up-to-date CSI to enhance prediction accuracy. More specifically, the practical realization of this system requires the development of an online CSI prediction scheme that takes into account metrics including but not limited to time, frequency band of operation, CubeSat position, and noise temperature.

Tackling long delays and temporal variation in network topology through Stateful Segment Routing: IoST is a classic example of a Long Fat Network (LFN), characterized by a large bandwidth-delay product which renders the traditional SDN approach sub-optimal. First, we note that the data plane in traditional SDN systems is stateless, i.e., the forwarding function of the switch is based on the match-action model which makes use of various packet header fields, such as the Ethernet source address or IPv4 destination address to match incoming flows to the corresponding entries in the flow table of the switch. The flow table entries in turn are set by the controller, which in this case happens to be the on-Earth NOOC. Consequently, the temporal variation in network topology causes flow table updates to become obsolete by the time they reach those CubeSats that are farther away from the NOOC. Second, we note that terrestrial reactive forwarding in use across a majority of the SDN systems is ill-suited for IoST owing to the large volume as well as frequency of control traffic. Traditionally, techniques such as control traffic balancing have been used to great effect for efficient management of control traffic, however, they are not inherently applicable to LFNs because of the prevailing delays in the environment. To this end, Stateful Segment Routing (SSR) is employed. SSR has been envisioned with a view to overcoming the drawbacks of the stateless data plane and minimizing control traffic. Segment Routing (SR) functions by dividing the path to be traversed into a sequence of logical segments, with a set of middle points interconnecting successive segments. In adapting SR for use in IoST, we note that it leads to a minimization in control traffic as the flow table entries are greatly reduced, as a result of the reduced set of forwarding entries that can be used for all flows that share a common middle point. Further, while SR constructs the logical paths (segments) between middle points.

Due to the ever-changing network topology, the next hop at each CubeSat, as decided by the NOOC may not always be reachable. Therefore, in IoST employs a stateful data plane, where forwarding is done based not only on the matching of header fields, but also on the system state, where state is defined a function of the network topology with time. The deterministic nature of the topological variations allows for accurate state characterizations, and the NOOC pre-emptively determines the best route for a number of such states and then each CubeSat can select the appropriate next hop, based on a combination of match fields and state. A challenge in implementing SSR lies in ensuring that flows are routed through paths that have a large number of middle points in common. Optimal middle point selection and path computation remain challenging even in the case of terrestrial wired networks. Additional complications introduced by a stateful data plane further make the problem even more difficult. Despite this, the heuristics must be efficient and scalable in order to maintain a low control plane response time.

Robust connectivity through optimal IoST Hub geo-locations: Given the small footprint of a single CubeSat, the need for continuous coverage necessitates the deployment of a CubeSat constellation, with multiple orbital planes, and multiple CubeSats within each plane. However, robust forwarding of control policies requires the presence of a low-latency control path. While easy to achieve in terrestrial wired and wireless scenarios, due to the inherent nature of the medium hop-by-hop forwarding of control messages in a CubeSat constellation is affected by high link latency. On the one hand, attempting to maintain a Line of Sight (LoS) link with each CubeSat in the constellation will make the number of IoST Hubs prohibitively large both from a cost as well as network management perspective. On the other hand, a single IoST Hub would result in extremely high convergence times affecting both network throughput and latency. A suitable middle ground can be found by having a limited number of IoST Hubs, and an additional number of IoGWs in order to implement gateway diversity. To address this issue, the IoST Hub placement problem can be addressed with multiple geo-distributed locations. The aim is to minimize both the number of Hubs required, and the control traffic convergence time across a large network. More specifically, with regard to the temporal variation in LoS CubeSats, the controller placement problem should determine: (i) the number of required IoST Hubs and their individual geo-locations, (ii) the number of IoGWs under each Hub and their geolocations, and (iii) the control domain assignments for each Hub. Solving an optimization problem of this kind is very challenging because it is NP-hard along with tremendous variables. It is impossible to solve and obtain the optimal values in a time-efficient manner (i.e., even finding a feasible solution will require a certain amount of computational time). To counter this challenge, it can be important to employ a fast approximation algorithm. Techniques such as LP relaxation, preprocessing, scaling, and randomized rounding prove useful in this context.

Synchronization of geo-distributed IoST Hubs: Inter-controller communication and synchronization across Hubs poses another challenge. In order to achieve logical centralization in the distributed environment, it is important to ensure that all IoST Hubs maintain the same global network view. The problem becomes even more challenging in long-delay environments that change with time, i.e., the network state changes at a rate faster than the time taken by the distributed controllers to converge to the same state, as a result only partial synchronization may be achieved. Further complications arise due to the fact that control domain assignments are a function of time as well traffic, unlike the wired case. Additionally, a major task is measuring the effectiveness of the synchronization solution, and its dependence on the network topology, which in the case of IoST spans both terrestrial and near-earth domains and examining the reliability of any such proposed solution. Further, the synchronization solution should also be resilient to Hub failures.

Proactive handovers through GSL outage forecasting: The GSLs between the IoST Hub and CubeSats are vital to connectivity as they form the first hop for both control and data traffic. GSL outages can be broadly classified into two categories: (i) outages due to CubeSat mobility, and (ii) outages due to atmospheric effects such as molecular absorption, rain attenuation, cloud attenuation, and scintillations. An outage event is characterized by a dip in the SNR below a predefined threshold value that causes an interruption in data transfer. Consequently, it can be important to preempt these link interruptions to maintain a high level of system reliability. At the outset, it is relatively easy to predict outages due to mobility because the movement of CubeSats is deterministic in nature. On other hand, outage events due to atmospheric effects are stochastic in nature, and consequently more difficult to predict. Thus, the development of low-complexity link outage prediction algorithms that run over the NOOC represents a challenge in this context. However, link outage prediction only solves half the problem, with the handover being the other half. If the IoST Hub is experiencing an outage at a given time, any attempt to establish GSLs with CubeSats in its domain will fail. However, IoST employs gateway diversity to ensure that the atmospheric effects across all IoGWs are uncorrelated. Further, satellite diversity is enforced through the fact that each IoGW is capable of establishing connectivity to different sets of CubeSats which are not necessarily overlapping. Therefore, the most suitable candidate IoGW is characterized not only by high link SNR, but also by the CubeSats it can communicate with in terms of the proximity of CubeSats from the destination. The principal idea here is to offset the handover interruption time by appropriate selection of the candidate IoGW. Once the candidate IoGW has been selected, the IoST Hub forwards data to it, which is then delivered to the CubeSat network.

Lightweight hardware virtualization for CubeSats: CubeSats can require virtualization of computing, storage, memory, and radio resources. However, the hypervisors that are commonly used in terrestrial networks have been designed for server-grade hardware. Consequently, the virtualization overhead introduced by established hypervisors makes them unsuitable for use in resource constrained devices such as CubeSats. Implementations of IoST must also develop lightweight virtualization solutions for CubeSats, that support radio resource virtualization with minimal overhead. More specifically, a large number of CubeSats make use of ARM-based microprocessors. With both Docker and LXC adding ARM support in recent years, there is a strong case for containerization in CubeSats.

Automated device provisioning through ANC: The IoST architecture provides the ANC for sensor device control, which we leverage for plug-and-play operation. Manual configuration and re-configuration of sensing devices is a time-consuming affair, and a significant impediment to network scalability, more so in the case of virtual sensor networks. Therefore, the ANC must provide a mechanism to enable zero-touch provisioning. The use of SDN is particularly beneficial to this end, as it allows for dynamic network reconfiguration through custom control functions such as task scheduling and energy management in resource-constrained sensing devices. Task scheduling has become increasingly important due to the proliferation of multi-function sensing devices. Each task is associated with a different application having its own sensing frequency, accuracy, and resolution. As devices join and leave the network, a challenge is determining which tasks shall be assigned to each of them, and in what order, constrained by the sensing capability and resource availability of the sensing device, and the requirements of each task. The heterogeneity of the networks and various QoS requirements make the scheduling and coordination of endpoint resources in IoST complex. Additionally, for the indirect access segment involving the IoGW, pre-processing and analysis could be performed at the IoST Hub, if necessary, to minimize bandwidth consumption in the CubeSat network.

System performance evaluation: Within the single-hop metrics, we direct our attention to the GSL and ISL link latencies considering the variation in delay of the link between IoGW and a CubeSat with increasing distance. One scenario under consideration assumes a uniform water vapor density of 7.5 g/m 3, and constellation orbital altitude of 500 km, with a gigabyte of data to be transferred from the IoST Hub to the CubeSat. On an average, there are 9 GSLs active at a given time, each being represented by a stem in the plot. Then, for each of the 9 links, we vary the carrier frequency from 3 to 300 GHz and observe the change in latency. The 3 GHz carrier due to its low data rate of 20 Mbps even at a relatively low separation of 500 km. Two general trends have been identified: first, the link latency decreases with increasing carrier frequencies; and second, the latency increases with increasing distance. The first result follows from the fact that larger carrier frequencies are able to support higher data rates, which in turn causes the transmission de-lay to fall, while the second result is attributed to falling data rates as a consequence of decreasing SNR, and increasing propagation delays with increase distance. For example, for a GSL separation of 510 km, the link latency falls from 3.52 s at 12 GHz to 0.10 s at 300 GHz, while for a 990 km GSL the latency rises to 0.91 s for the same 300 GHz carrier. In addition, an anomaly that becomes apparent at distances close to 900 km. The 60 and 180 GHz carriers exhibit the worst performance as a result of molecular absorption due to oxygen and water vapor respectively. This represents the change in latency for an ISL with change in the CubeSat separation. Since the water vapor density in the exosphere is negligible, we do not consider its impact on the link delay. Further, in the absence of molecular absorption, the results obtained follow the general trend, and do not show any anomalies. A link separation of 330 km results in delays of 5.85 s and 0.05 s at 60 GHz and 300 GHz respectively, increasing to 19.36 s and 0.07 s for a separation of 600 km. An increase in the data rate due to an increase in the carrier frequency causes a decrease in the average link latency and increasing link separations result in rising link latencies due to increasing propagation delays and falling data rates. Further, we note that there are 10 active links on an average regardless of the constellation configuration.

Next-hop link metrics: The next-hop link metrics include parameters such as the number of available next hops, the number of CubeSats within a Hub's control domain, and the duration for which a link is active before a handover takes place. These metrics help quantify the network topology and play a vital role in system modeling. Both metrics are characterized by an increasing trend with increase in orbital altitude.

IoST expands the functionalities of the traditional IoT, by not only providing an always-available satellite back-haul network, but also by contributing real-time satellite-captured information and, more importantly, performing integration of on the ground data and satellite information to enable new applications. The fundamental building block for IoST is a new generation of CubeSats, which are augmented with SDN and NFV solutions. The use of SDN and NFV allows use pf concepts such as vCSI, SSR, and satellite diversity that are purpose-built for tackling the long delays and topological variations that characterize the space environment. Additionally, the major open problems which are critical to a full deployment of CubeSat-based IoST are identified. A system performance evaluation covering single-hop, next-hop, and end-to-end metrics further cements the potential of IoST. In this manner, IoST helps realize pervasive end-to-end global connectivity.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A control and management layer for an ad hoc network of cube satellites, comprising:
    (a) a plurality of multi-use cube satellites having both a network communication ability and sensing ability;
    (b) at least one ground-based hub for communicating with the plurality of multi-use cube satellites;
    (c) an access gateway for energy constrained devices configured to communicate with the plurality of multi-use cube satellites; and
    (d) a virtualization manager configured to make virtualized resources available to a slice controller and configured to map of physical resources in the ad hoc network to a plurality of virtual entities.

2. The control and management layer of claim 1, further comprising a network orchestration and operations controller for generating stateful segment routing (SSR) control commands to the access gateway so as to control communications between each satellite of the plurality of cube satellites in a constantly changing network topology so as to route communications across multiple cube satellites while they are all in motion.

3. The control and management layer of claim 1, further comprising an automatic device provisioning system configured to provision devices in the cube satellites in a continually reconfiguring network.

4. The control and management layer of claim 3, wherein the devices comprise sensors.

5. A communications network, comprising:
    (a) at least one central communications station that serves as a ground-based hub and that includes a fixed transceiver;
    (b) an ad hoc network of a plurality of mobile units, each of the plurality of mobile units in motion relative to each other, each of the plurality of mobile units including a mobile transceiver that is configured to communicate with each other one of the plurality of mobile units when the other one of the plurality of mobile units is within a predefined range, the mobile transceiver of at least one of the plurality of mobile communications units configured to communicate with the fixed transceiver;
    (c) a control system in communication with the fixed transceiver and configured continuously to determine a configuration of the ad hoc network and to communicate network control information for each of the plurality of mobile units so as to maintain communications between each of the mobile units in the ad hoc network;
    (d) an access gateway for energy constrained devices configured to communicate with the plurality of multi-use cube satellites; and
    (e) a virtualization manager configured to make virtualized resources available to a slice controller and configured to map of physical resources in the ad hoc network to a plurality of virtual entities,
    wherein at least one of the mobile units is configured to disseminate the network control information to other ones of the plurality of mobile units via the ad hoc network.

6. The communications network of claim 5, wherein at least one of the mobile units comprises a satellite.

7. The communications network of claim 6, wherein the satellite comprises a cube satellite.

8. The communications network of claim 6, wherein the satellite comprises a set of cube satellites.

9. The communications network of claim 5, wherein at least one of the mobile units comprises a ground-based vehicle.

10. The communications network of claim 5, wherein the predefined range comprises a range in which two of the mobile units are within line-of-sight of each other.

11. A control and management layer for an ad hoc network of cube satellites, comprising:
    (a) a plurality of multi-use cube satellites having both a network communication ability and sensing ability;
    (b) at least one ground-based hub for communicating with the plurality of multi-use cube satellites;
    (c) an access gateway for energy constrained devices configured to communicate with the plurality of multi-use cube satellites; and
    (d) a network orchestration and operations controller for generating stateful segment routing (SSR) control commands to the access gateway so as to control communications between each satellite of the plurality of cube satellites in a constantly changing network topology so as to route communications across multiple cube satellites while they are all in motion.

12. The control and management layer of claim 11, further comprising a virtualization manager configured to make virtualized resources available to a slice controller and configured to map of physical resources in the ad hoc network to a plurality of virtual entities.

13. The control and management layer of claim 11, further comprising an automatic device provisioning system configured to provision devices in the cube satellites in a continually reconfiguring network.

14. The control and management layer of claim 13, wherein the devices comprise sensors.

* * * * *